United States Patent [19]

Pennington et al.

[11] Patent Number: 5,108,153

[45] Date of Patent: Apr. 28, 1992

[54] ELEVATED ROADWAY FOR CONTINUOUS HAULAGE UNIT

[75] Inventors: John H. Pennington; Frank Silberman, both of Green River, Wyo.

[73] Assignee: General Chemical Corporation, Parsippany, N.J.

[21] Appl. No.: 663,449

[22] Filed: Mar. 1, 1991

[51] Int. Cl.$^5$ ............... B65G 21/02; F21C 35/20
[52] U.S. Cl. ................. 299/64; 198/830; 198/860.2
[58] Field of Search ............... 299/18, 64, 67; 248/676, 678; 198/828, 830, 860.1, 860.2

[56] References Cited

U.S. PATENT DOCUMENTS 2,793,738  5/1957  Erickson ............... 198/860.1
3,104,009  9/1963  Ramer .................. 198/830

FOREIGN PATENT DOCUMENTS 788374   1/1958  United Kingdom ........ 198/830
1342483  1/1974  United Kingdom ........ 198/861.2

Primary Examiner—David J. Bagnell
Attorney, Agent, or Firm—Brumbaugh, Graves, Donohue & Raymond

[57] ABSTRACT

An elevated roadway for use with a self-propelled continuous haulage unit in underground mining consists of a multiplicity of substantially identical roadway units joined together end to end. Each unit has a pair of elongated bottom side beams joined by bottom cross beams, columns arranged in laterally opposite pairs and supported on the side beams and a pair of elongated track members supported on the upper ends of the columns and defining a track for trams to move over the roadway above the haulage unit. Longitudinal brace beams and transverse brace beams join the columns. The durability and rigidity of the unit is enhanced by diagonal brace beams connecting selected ones of the columns and by gussets at each joint between the bottom side beams and the bottom transverse beams.

4 Claims, 3 Drawing Sheets

ELEVATED ROADWAY FOR CONTINUOUS HAULAGE UNIT

BACKGROUND OF THE INVENTION

In Jan., 1989, the owner of the present invention put into operation a new elevated roadway over a self-propelled continuous haulage unit (a flexible continuous tram or "FCT" unit) for movement of trams over the FCT to transport personnel and equipment between the head end and the tail end of the FCT. The roadway performed satisfactorily as far as providing the necessary track for the trams was concerned, but it proved to be quite difficult to center back up after each movement of the haulage unit. It also proved to have insufficient durability to sustain the repeated moves and recenterings, which involved dragging it about 80 feet approximately every three days or so and then realigning it. The roadway was 480 feet in length, consisting of 48 units, each 10 feet long. It rapidly deteriorated to a point of near destruction of all 48 units.

The task of designing the roadway to integrate with the cars, belt and cat track of the FCT unit, to leave the center region above the FCT belt completely clear of framing so as to facilitate transport of mined material on the belt and to keep the track as low as possible were formidable, as were the problems of improving the design.

SUMMARY OF THE INVENTION

The present invention relates to improvements in the roadway that made it possible to salvage it and, indeed, to eliminate virtually entirely the previous problems encountered in dragging it when the FCT is moved and recentering it after repositioning the FCT.

As originally constructed, each unit of the roadway consisted of a pair of elongated lower side beams positioned in laterally spaced-apart parallel relation, a multiplicity of longitudinally spaced-apart bottom cross beams joined at each end to a respective one of the lower side beams, a multiplicity of longitudinally spaced-apart columns arranged in laterally opposite pairs and fastened at their lower ends to a respective one of the lower side beams, and a pair of elongated track members fastened to the upper ends of the columns in parallel laterally spaced-apart relation and defining a track for trams to move over the roadway above the haulage unit. A multiplicity of longitudinal brace beams located above and parallel to the bottom beams joined some of the adjacent columns on each side, and a multiplicity of transverse brace beams, one for each pair of opposite columns, joined the columns on either side of the unit. Skids on each bottom beam supported the roadway unit above a floor of a mine shaft so that the roadway could be dragged along the floor by the FCT when the FCT was moved.

The improvement of the roadway, according to the present invention, comprises a first diagonal brace beam fastened at one end to a first column on one side of the unit and fastened at its other end to a second column on the other side of the unit and a second diagonal brace beam fastened at one end to a third column on one side of the unit and fastened at its other end to a fourth column on the other side of the unit, the diagonal brace beams being located above the bottom beams. Furthermore, according to the present invention, there is a first pair of gussets joining one end of each of the bottom cross beams to one of the bottom side beams and a second pair of gussets joining the other end of each of the bottom cross beams to the other bottom side beam.

In a preferred embodiment of a roadway according to the invention, there are five pairs of opposite columns defining four adjacent structural bays, and the first and second diagonal brace beams extend across non-adjacent bays. Each of two non-adjacent bays is adapted to receive a car of the haulage unit, and the diagonal brace beams extend across the remaining two bays. The longitudinal brace beams join only the columns of the bays that receive the cars of the haulage unit, and the diagonal brace beams stiffen the remaining bays in both the lateral and longitudinal directions. The diagonal brace beams are located at the same height as the transverse brace beams.

For a better understanding of the invention, reference may be made to the following description of an exemplary embodiment, taken in conjunction with the figures of the accompanying drawings.

DESCRIPTION OF THE EMBODIMENT

Figure 1:
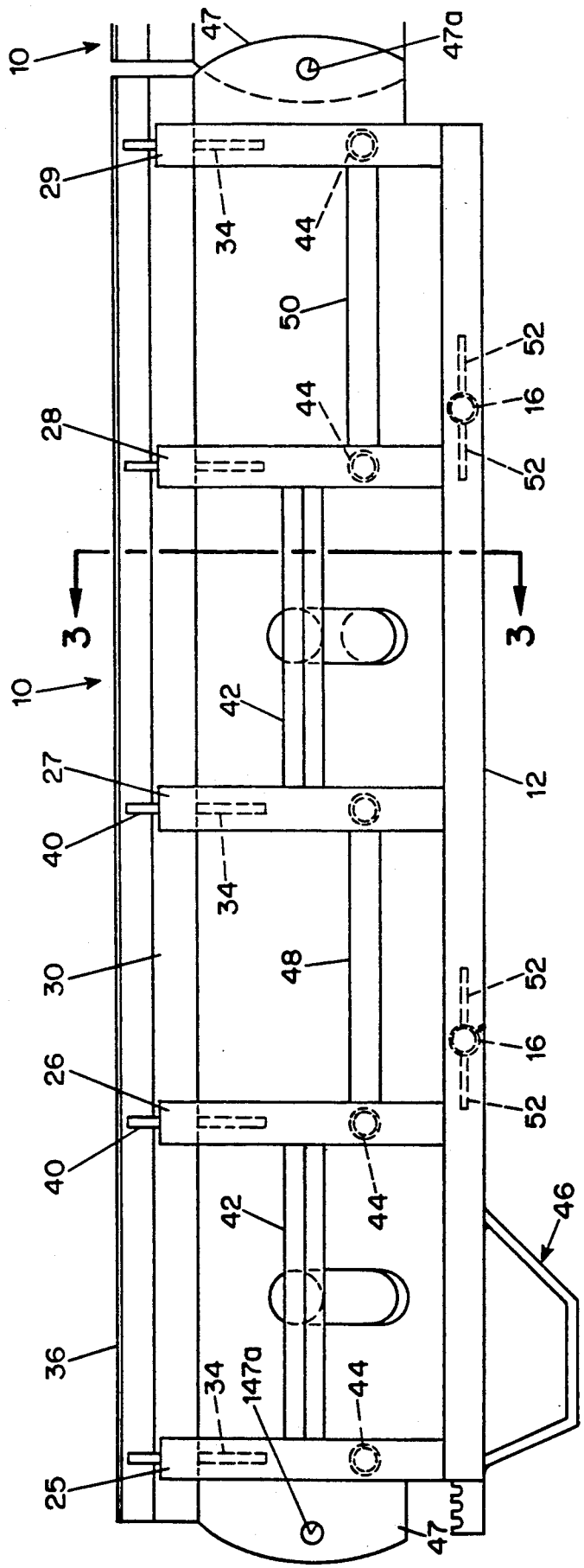
FIG. 1 is a side elevational view of a roadway unit or the embodiment.
Figure 2:
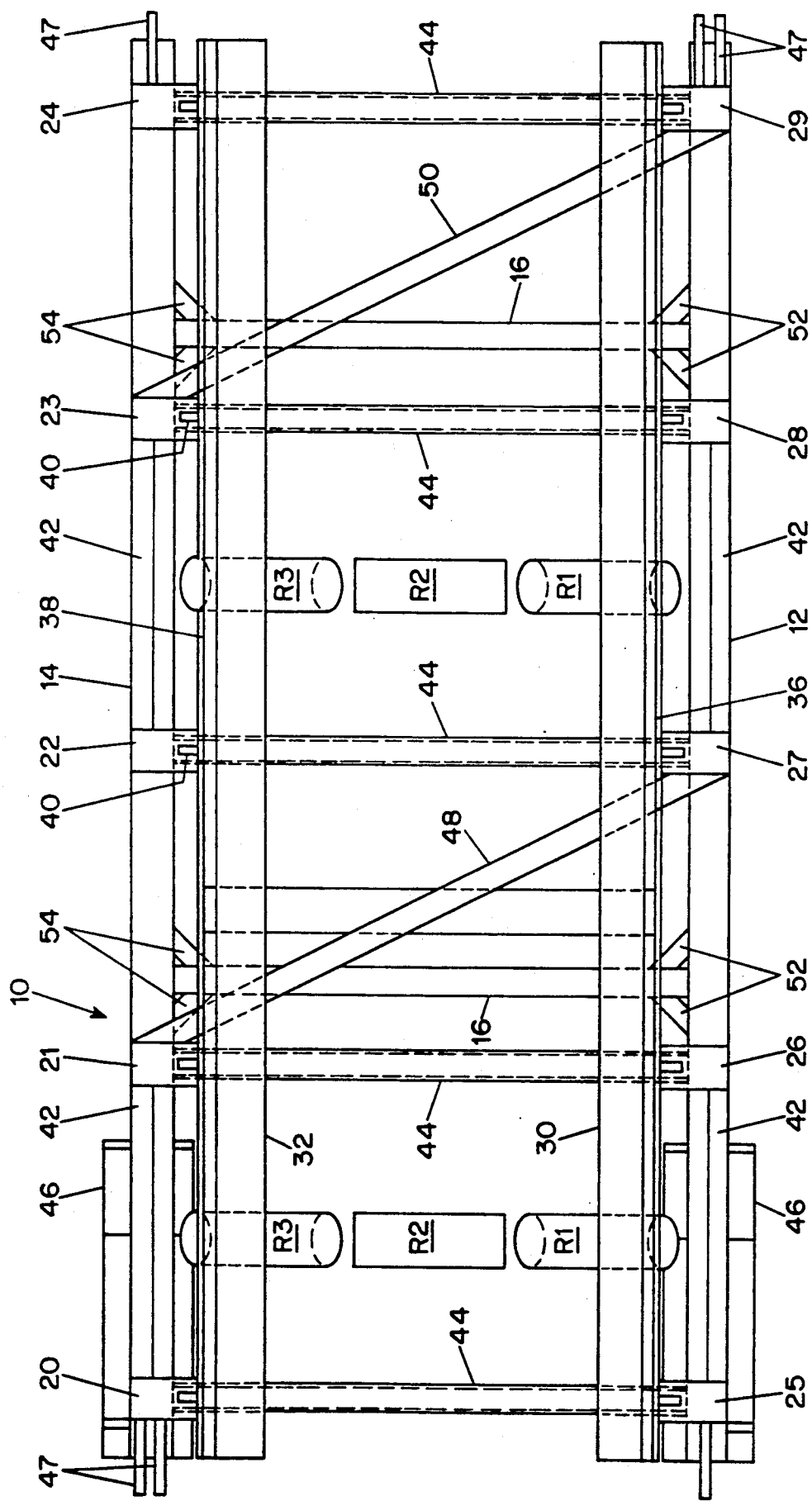
FIG. 2 is a top plan view of the embodiment.
Figure 3:
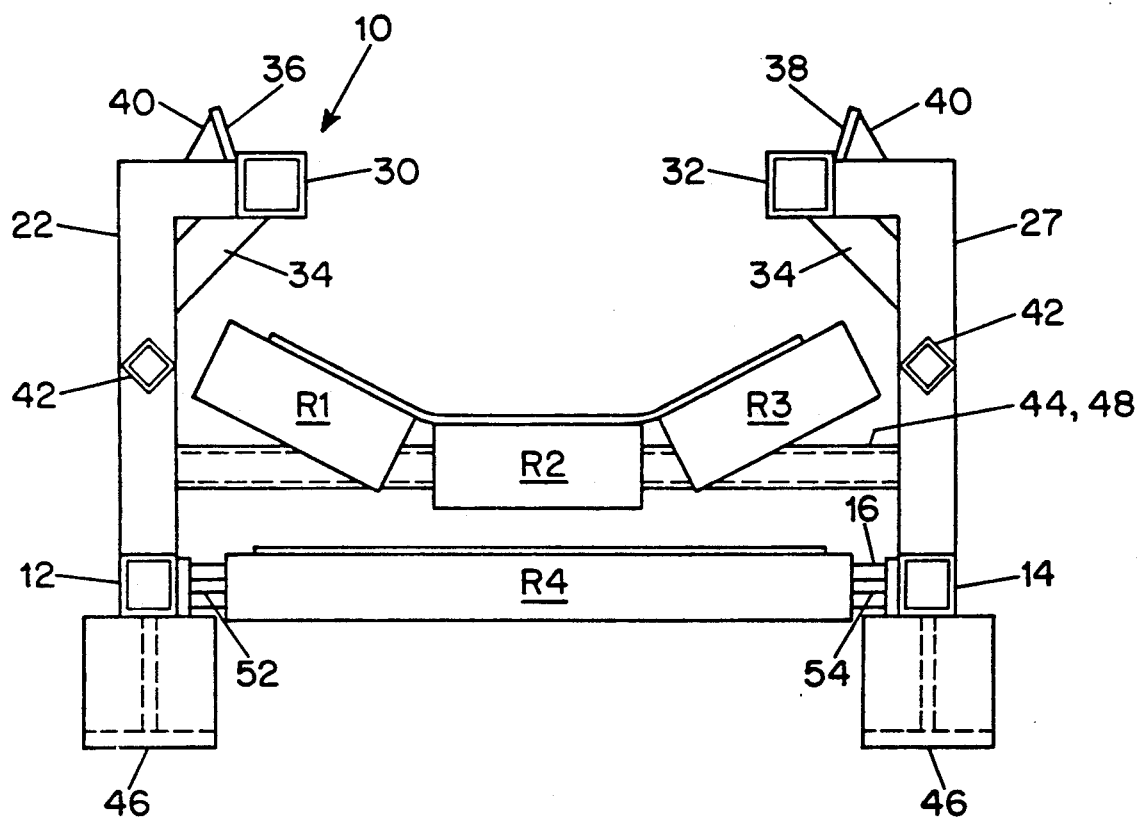
FIG. 3 is an end cross-sectional view of the embodiment, taken along the lines 3—3 of FIG. 1.

The elevated roadway, as originally constructed and used and as improved, consists of a multiplicity of substantially identical roadway units 10 joined together end to end. Each unit 10 has a pair of elongated lower side beams 12 and 14 positioned in laterally spaced-apart parallel relation, two longitudinally spaced-apart cross beams 16 and joined at each end to a respective one of the lower side beams, a multiplicity of longitudinally spaced-apart columns 20...29 arranged in laterally opposite pairs and fastened at their lower ends to a respective one of the lower side beams, and a pair of elongated track members 30 and 32 fastened to the upper ends of the columns in parallel, laterally spaced-apart relation and defining a track for trams to move over the roadway above the haulage unit. The columns 20...29 are of inverted "L" shape, and the shorter, upper horizontal leg of each column is braced to the longer vertical leg by a gusset 34 to support the track members in cantilevered relation to the vertical legs of the columns. Each track member 30, 32 is flanked by a guide rail 36, 38, with gussets 40 bracing it at each column location.

The ten columns of the unit, five on each side, define four longitudinally adjacent structural bays. Two non-adjacent bays receive cars of the FCT (haulage unit), as represented schematically in the drawings by the rollers R1, R2, R3 that support the upper run of the FCT belt and the roller R4 that supports the lower run of the belt. Each of those bays has longitudinal brace beams 42 located above and parallel to the bottom beams and fastened at one end to one column and at the other end to an adjacent column. Transverse brace beams 44, one for each pair of opposite columns, are fastened at one end to one column and at the other end to an opposite column. The transverse brace beams 44 are located above the bottom beams, but at an elevation lower than the longitudinal brace beams 42. A skid 46 is fastened at one end of each bottom beam 12, 14. The two skids on each unit support one end of that unit and the opposite end of an adjacent unit above a floor of a mine shaft and facilitate sliding of the roadway along the floor when the haulage unit is moved. In this regard, coupling plates 47 at each corner of each unit of the roadway mate with their counterparts of the adjacent units and receive coupling pins through holes 47a that couple the units vertically and horizontally.

As described thus far, the roadway is known in the prior art by virtue of its commercial use beginning in early 1989. One of the improvements, according to the present invention, is the provision of a first diagonal brace beam 48 fastened at one end to a first column 21 on one side of the unit and fastened at its other end to a second column 27 on the other side of the unit and a second diagonal brace beam 50 fastened at one end to a third column 23 on one side of the unit and fastened at its other end to a fourth column 29 on the other side of the unit. The diagonal brace beams 48 and 50 are located above the bottom beams and at the same height as the transverse brace beams 44. The other improvement involves adding a first pair of gussets 52 joining one end of each of two of the bottom cross beams 16 to one bottom side beams 12 and a second pair of gussets 54 joining the other end of each of the two bottom cross beams 16 to the other bottom side beam 14.

The diagonal brace beams 48 and 50 stiffen two of the four bays of the structure diagonally and, in conjunction with the transverse brace beams, minimize skewing of the structure, relative to a horizontal plane. The diagonal brace beams also strengthen the structure both longitudinally and transversely. The gussets 52 and 54 strengthen the junctures between the bottom side beams 12 and 14 and the bottom transverse beams against failure and also increase the resistance of the unit to horizontal skewing. The improved roadway has been in use for several months and has endured numerous moves and realignments without exhibiting any deformations or failures.

I claim:

1. In an elevated roadway for use with a self-propelled continuous haulage unit in underground mining, which roadway consists of a multiplicity of substantially identical roadway units joined together end to end, each roadway unit having a pair of elongated lower side beams positioned in laterally spaced-apart parallel relation, a multiplicity of longitudinally spaced-apart cross beams joined at each end to a respective one of the lower side beams, five pairs of longitudinally spaced apart columns arranged in laterally opposite pairs, defining four adjacent structural bays, and fastened at their lower ends to a respective one of the lower side beams, a pair of elongated track members fastened to the upper ends of the columns in parallel laterally spaced-apart relation and defining a track for trams to move over the roadway above the haulage unit, a multiplicity of longitudinal brace beams,. each of which is fastened at one end to one column and at the other end to an adjacent column and is located above and parallel to a lower side beam, a multiplicity of transverse brace beams, one for each pair of opposite columns and each of which is fastened at one end to one column and at the other end to an opposite column at locations above the lower side beams, and at least one skid member on each lower side beam and adapted to support the roadway unit above a floor of a mine shaft and to facilitate skidding the roadway along the mine floor when the haulage unit is moved, the improvement wherein each roadway unit comprises a first diagonal brace beam fastened at one end to a first column on one side of the roadway unit and fastened at its other end to a second column on the other side of the roadway unit, a second diagonal brace beam fastened at one end to a third column on one side of the roadway unit and fastened at its other end to a fourth column on the other side of the roadway unit, the diagonal brace beams being fastened to the respective columns at locations above the lower side beams and the first and second diagonal brace beams extending across non-adjacent structural bays, and a first pair of gussets joining one end of each of two of the cross beams to one of the lower side beams and a second pair of gussets joining the other end of each of said two cross beams to the other lower side beam.

2. The improvement according to claim 1 wherein each of two non-adjacent structural bays of each roadway unit is adapted to receive a car of the haulage unit and the diagonal brace beams of each roadway unit extend across the remaining two bays.

3. The improvement according to claim 2 wherein longitudinal brace beams of each roadway unit join only the columns of the bays that receive the cars of the haulage unit, whereby the diagonal brace beams stiffen the remaining two bays in both the lateral and longitudinal directions.

4. The improvement according to claim 1 wherein the diagonal brace beams are at the same height as the transverse brace beams.

* * * * *

UNITED STATES PATENT AND TRADEMARK OFFICE
CERTIFICATE OF CORRECTION

PATENT NO. : 5,108,153
DATED : April 28, 1992
INVENTOR(S) : Pennington et al.

It is certified that error appears in the above-identified patent and that said Letters Patent is hereby corrected as shown below:

Title page, Item 75, 2nd line, "Silberman" should read --Silbermann--;

Col. 2, line 22, "unit or" should read --unit of--;

Col. 2, line 36, "16 and" should read --16--;

Col. 3, line 22, "beams" should read --beam--; and

Col. 3, line 38, "I claim:" should read --We claim:--.

Signed and Sealed this

Seventeenth Day of August, 1993

Attest:

BRUCE LEHMAN

Attesting Officer

Commissioner of Patents and Trademarks